Dec. 17, 1968 SHIGESABURO NAKAGAWA 3,416,306
ENCRUSTED JEWELRY CHAIN
Filed Feb. 20, 1967 7 Sheets-Sheet 1

INVENTOR
Shigesaburo Nakagawa
BY
Polachek & Saulsbury
ATTORNEYS

Dec. 17, 1968 SHIGESABURO NAKAGAWA 3,416,306

ENCRUSTED JEWELRY CHAIN

Filed Feb. 20, 1967 7 Sheets-Sheet 2

INVENTOR

Shigesaburo Nakagawa

BY Polachek & Saulsbury

ATTORNEYS

INVENTOR
Shigesaburo Nakagawa
BY Polachek & Saulsbury
ATTORNEYS

ENCRUSTED JEWELRY CHAIN

Filed Feb. 20, 1967 7 Sheets-Sheet 4

INVENTOR
Shigesaburo Nakagawa
BY Polachek & Saulsbury
ATTORNEYS

Dec. 17, 1968

SHIGESABURO NAKAGAWA 3,416,306

ENCRUSTED JEWELRY CHAIN

Filed Feb. 20, 1967

7 Sheets-Sheet 5

INVENTOR

Shigesaburo Nakagawa

BY

Polachek & Saulsbury

ATTORNEYS

Dec. 17, 1968 SHIGESABURO NAKAGAWA 3,416,306

ENCRUSTED JEWELRY CHAIN

Filed Feb. 20, 1967 7 Sheets-Sheet 6

INVENTOR

Shigesaburo Nakagawa

BY Polachek & Saulsbury

ATTORNEYS

INVENTOR
Shigesaburo Nakagawa
BY [signature]
ATTORNEYS

United States Patent Office 3,416,306
Patented Dec. 17, 1968

3,416,306
ENCRUSTED JEWELRY CHAIN
Shigesaburo Nakagawa, 1,176 Yawata-Machi, Ichikawa, Chiba Prefecture, Japan
Filed Feb. 20, 1967, Ser. No. 617,399
10 Claims. (Cl. 59—80)

ABSTRACT OF THE DISCLOSURE

The disclosure describes jewelry chains having different external configurations produced by electroforming rough, porous jackets around core links of various shapes.

Figures 1, 1A, 2, 2A, 2B, 3, 3A, 4, 4A, 4B:
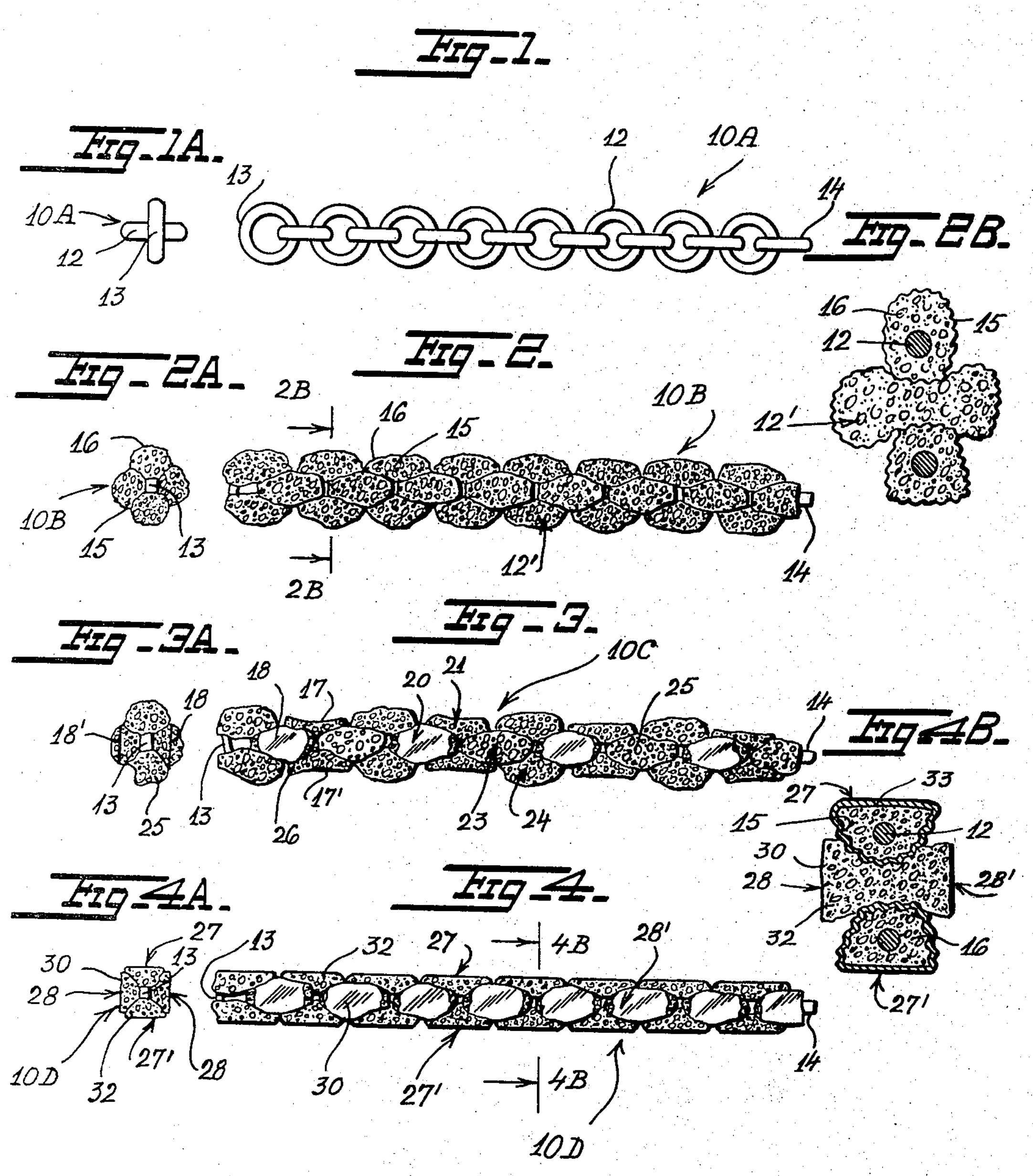
Figures 5, 5A, 6, 6A, 7, 7A, 8, 8A:
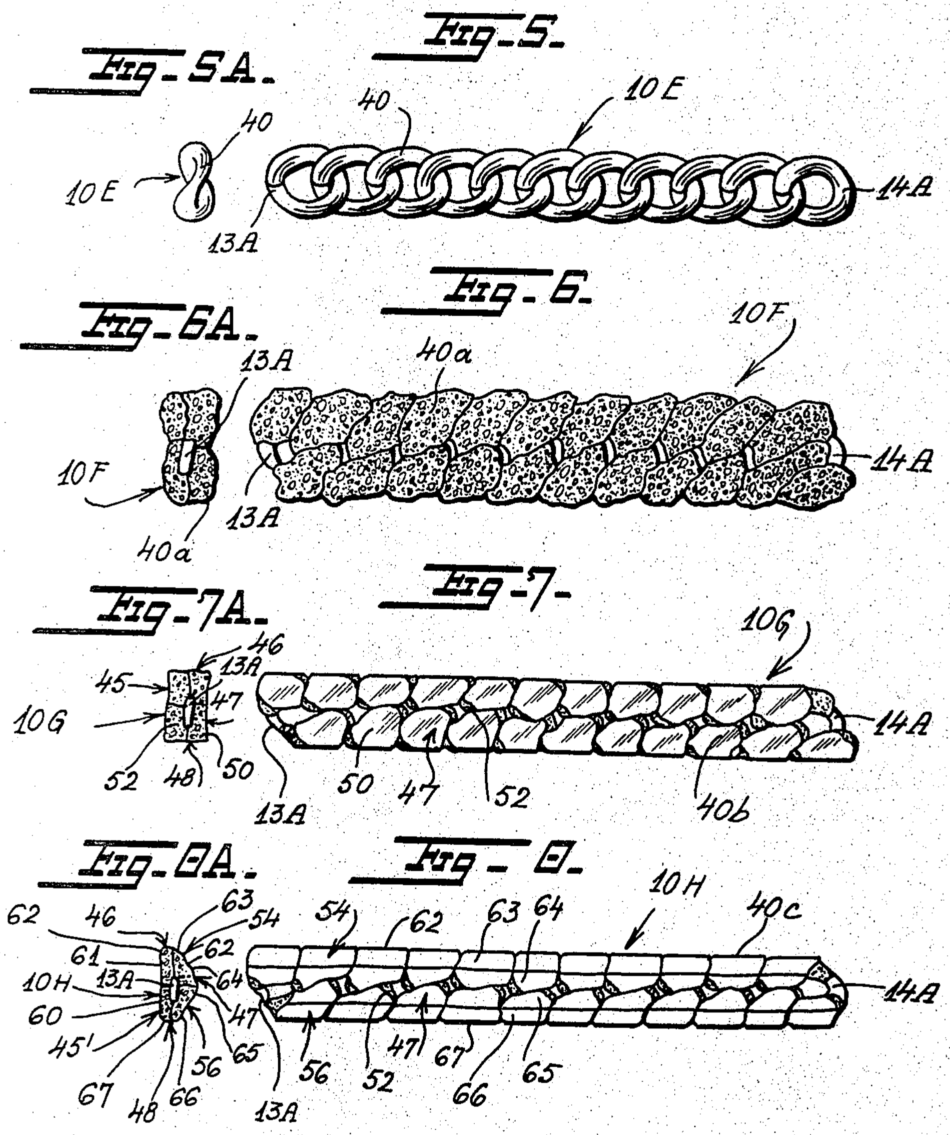
Figure 9A:
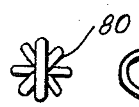
Figure 9:
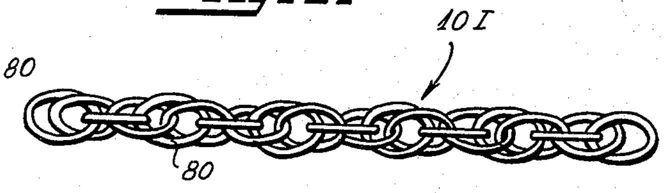
Figures 10, 10A:
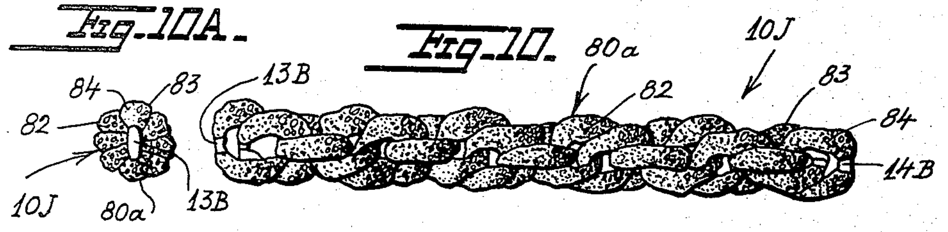
Figure 11A:
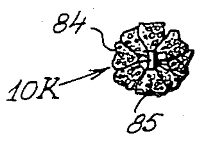
Figure 11:
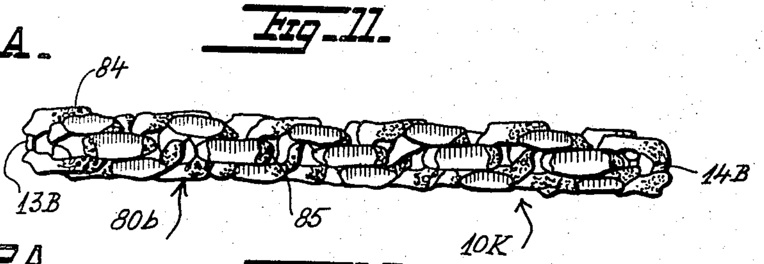
Figures 12, 12A:
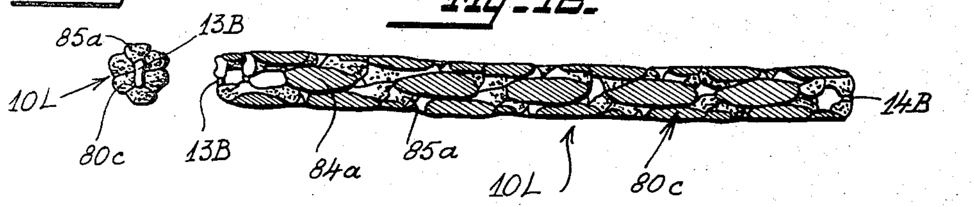
Figures 13, 13A:
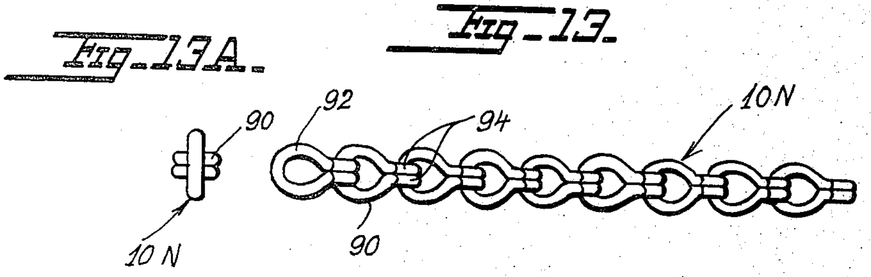
Figures 14, 14A:
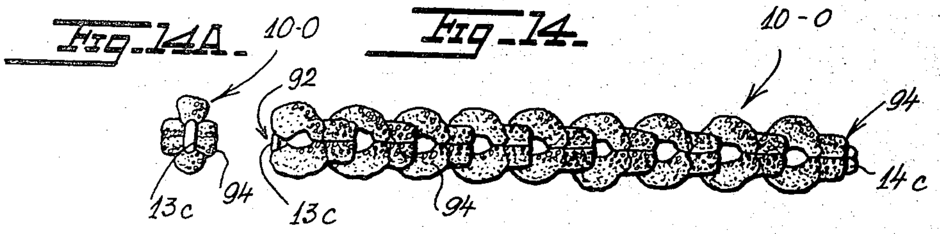
Figures 15, 15A:
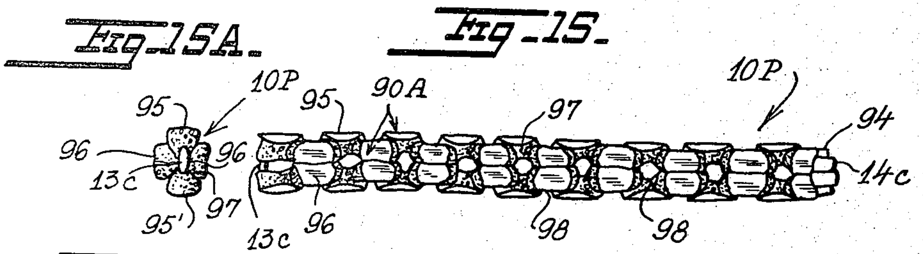
Figures 16, 16A:
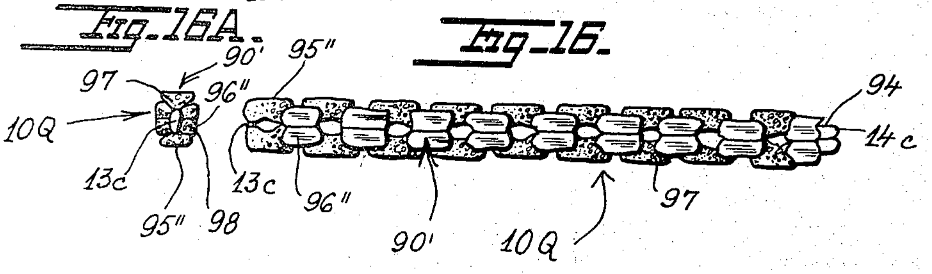
Figure 17A:
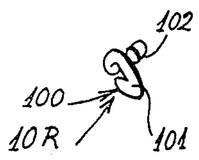
Figure 17:
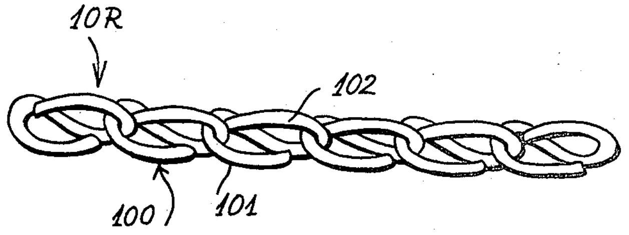
Figure 18A:
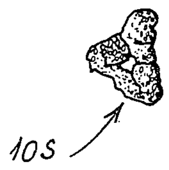
Figure 18:
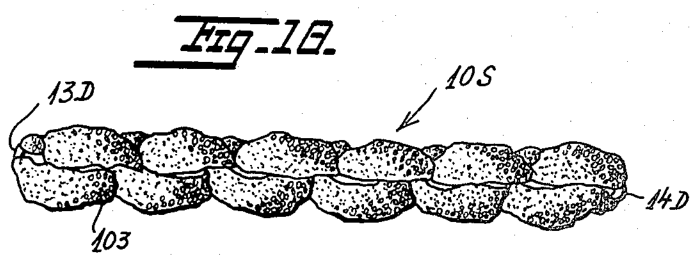
Figure 19A:
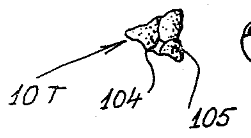
Figure 19:
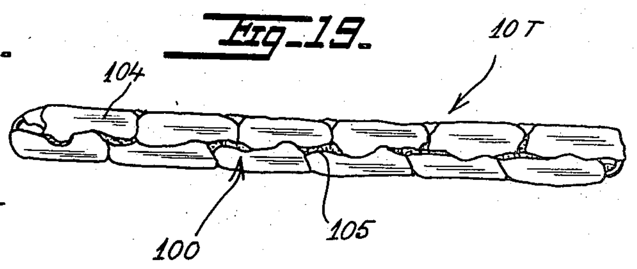
Figure 20A:
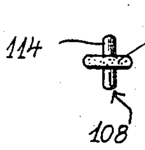
Figure 20:
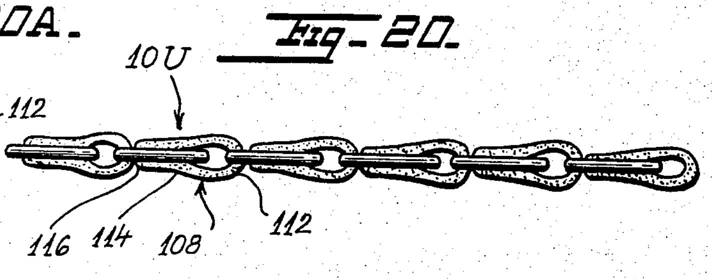
Figures 21, 21A:
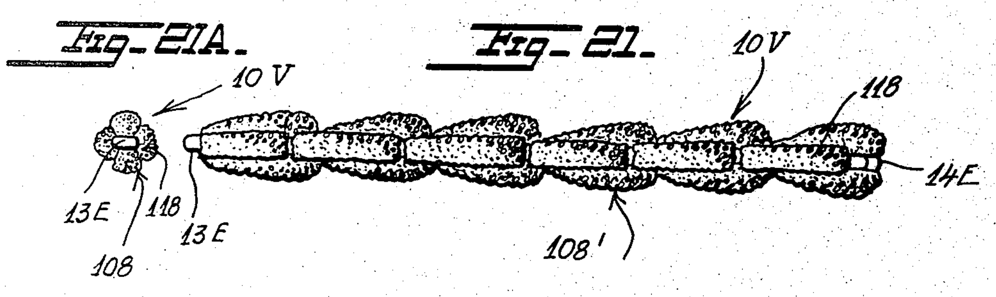
Figures 22, 22A:
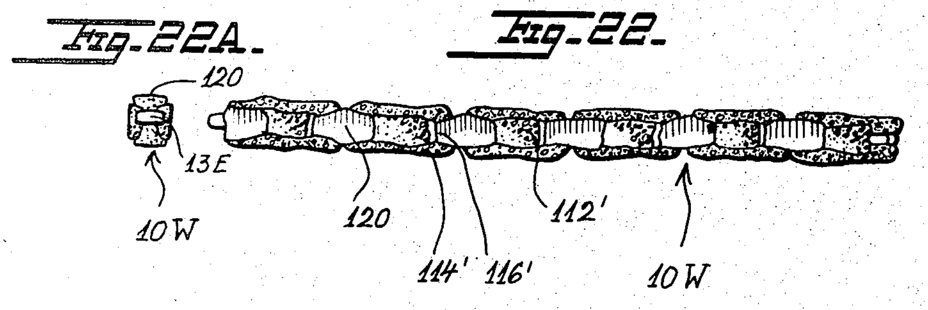
Figures 23, 23A, 24, 24A, 25, 25A, 26:
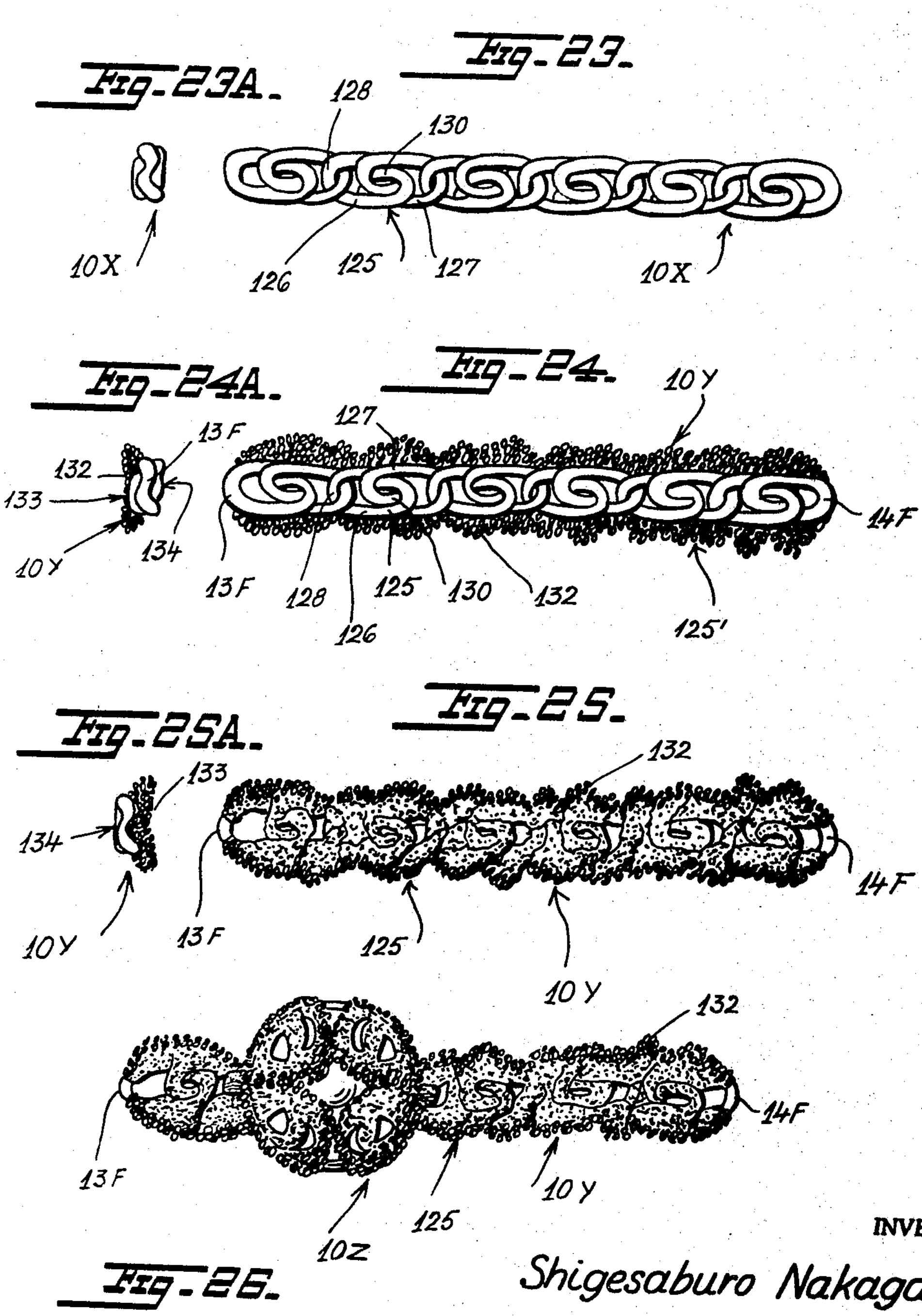

This invention relates to the art of jewelry chain manufacture.

Heretofore jewelry chains whether made by machinery or by hand have all involved mechanical steps to deform or remove metal. Such steps include cutting, grinding, bending, punching, stamping, hammering, rolling, filling, drawing, and polishing. Where electroplating has been used, it has only been to impart a glossy metallic finish to the links of the chain. Electroforming might have been tried to form individual links. However, it requires supplementary mechanical steps to complete the chains made from these links, and the resulting chains look like chains made entirely by mechanical methods mentioned above.

The object of the present invention is to provide a jewelry chain of unusual appearance, with links having unusual irregular surfaces and configurations not possible of attainment heretofore.

In chains made by the present invention, an ordinary machine made chain of links of precious or base metal is subjected to an electrochemical forming process in which the links are thickened and distorted electrochemically deposited metal. The metal is deposited non-uniformly so as to result in rough, porous, granular surfaces. Heretofore such rough electroplated surfaces have been scrupulously avoided in jewelry manufacture because this has been regarded as defective electroplating. Electroforming processes have been used heretofore in the metal working arts to produce moulds, irregularly shaped machine parts, and other mechanical forms. In all cases the processes have been directed at producing smooth, hard, dense, uniform deposits. There, as in the jewelry manufacturing arts, soft granular surfaces and irregularities of deposits were considered defects; and work having such defects was regarded as spoiled and treated as waste and scrap. In the present invention, by contrast, the electroforming process is especially pursued in such a manner as to produce the rough granular, irregular, porous surfaces and configurations heretofore universally avoided in the prior art. The deposited metal is so applied to the chains that flexibility or relative movement between links is retained sufficiently to enable ends of the chain to be brought together. Thus, the resulting structure can be worn as a chain necklace, bracelet, anklet or the like. As a result of the electroforming step, the links of the chain are rough, granular and coarse in appearance. They may then be finished in a variety of ways.

The invention will be better understood from the following detailed description taken in conjunction with the drawing wherein:

FIGURES 1, 5, 9, 13, 17, 20, 23 show different types of jewelry chains known in the prior art.

FIGS. 2–4, 6–8, 10–12, 14–16, 18–19, 21–22, and 24–25 are side views of the chains of FIGS. 1, 5, 9, 13, 17, 20 and 23 respectively at successive stages of manufacture, according to the invention.

FIGS. 1A—25A are end views of the chains of FIGS. 1–25 respectively.

FIGS. 2B and 4B are enlarged sectional views taken on lines 2B—2B and 4B—4B of FIGS. 2 and 4 respectively.

Referring first to FIGS. 1 and 1A there is shown a chain 10A of round links 12 disposed perpendicular to each other. This is generally known as a cable chain or cable link chain. The chain can be made wholly or partially by hand or by metal working machinery of some known type. Starting with this chain the present manufacturing process begins. The chain of any desired length is supported at ends 13, 14 and is immersed in an electroplating bath and electroplated. A suitable electroplating solution may contain:

80 grams per liter of cuprous cyanide
7 to 10 grams per liter of free cyanide
10 grams per liter of potassium sodium tartrate Electroplating is performed at approximately 60° C. at 5 volts D.C. The electroplating proceeds rapidly and a rather soft, porous, granular thickening of the links occurs. When plating is formed at a speed greater than normally used in the art and generally considered to result in defective plating, more metallic copper is deposited on free surfaces than in fine crevices, holes and interstices. This is the procedure followed here. When the chain is removed from the electroplating or rather electroforming bath, the chain 10B will have the appearance somewhat as shown in FIGS. 2 and 2A. The roughness, pores and irregularities 15 in the deposited coatings and encrustations 16 are plainly visible. The chain, quite surprisingly is still quite flexible, and sufficiently so, so that its ends can easily be brought together. This occurs because as indicated, rapid electroforming results in less deposited material at the inside points where the links move with respect to each other. Thus the chain structure is such that it is practical for use and wear as a jewelry chain. It will be noted that uncoated or uncovered points 13, 14 are at the opposite ends of the chain where the chain was supported by suitable supports in the electroforming bath. These ends of the chain can serve for attachment of appropriate clasp members of any kind desired.

At the end of the electroforming step, as illustrated by FIGS. 2, 2A, and 2B original round, flat form of the links is distorted and is now only suggested but not clearly defined. The copper or other metal enlargements can now be finished by electroplating a thin base coating of nickel and a thin finish coating of gold, silver, rhodium or the like. These fine, bright finish coatings are applied by conventional electroplating methods well known in the art.

While the finished chain 10B may have the link configurations 12' shown in FIGS. 2 and 2B, other finished shapes may be desirable. The chain 10B can be subjected to mechanical treatment before applying the bright, precious metal finish. As one example, opposite sides 17, 17' and 18, 18' of alternate pairs of links 20, 21 can be ground to form flat or concave lands as shown in FIGS. 3 and 3A. The remaining alternate pairs of links 23, 24 are not ground. The chain 10C after selective grinding has been completed can now be subjected to a finishing electroplating process to present a gold, silver or other bright metallic appearance. The chain 10C as shown in FIGS. 3 and 3A has a novel configuration not obtainable by any prior known method. Links 23, 24 have rough, coarse, porous surfaces 25 on all sides. The other links 20, 21 have smooth surface portions 17, 17', 18, 18' and coarse, porous surface portions 26. All surfaces may be bright finished, or they may have a matte finish produced by suitable treatment with a fine brush.

If a different chain configuration 10D shown in FIGS. 4, 4A is desired, the chain 10B shown in FIGS. 2 and 2A can be entirely ground flat on one pair of opposite sides ornamental ways. Still other forms of jewelry chains can be made in the ways described.

What is claimed is:

1. A jewelry chain comprising a chain of original links, an encrustation of metal completely covering each of the links with thicker parts of the encrustation at outer wider exposed parts of the original links and with thinner parts of the encrustation at inner, recessed and narrow parts of the original links, so that the encrusted links are movable with respect to each other, said encrustation having granular surfaces.

2. A jewelry chain as recited in claim 1, further comprising a bright metal coating on all outer surfaces of the encrustations, said coating being thin enough to leave the outer surfaces of the encrustations in a rough, porous condition.

3. A jewelry chain as recited in claim 1, further comprising smooth lands formed at selected portions of said outher surfaces, each land being surrounded by rough, porous areas and parts of the encrustation.

4. A jewelry chain as recited in claim 3, further comprising a bright metal coating on all outer surfaces of the encrustations and lands, said coating being thin enough to leave the outer surfaces of the encrustations in a rough, porous condition.

5. A jewelry chain as recited in claim 3, wherein the lands are formed at opposite sides of each encrusted link so that the encrusted links are generally rectangular in cross section.

6. A jewelry chain as recited in claim 2, wherein ends of encrusted links at opposite ends of the chain are free from encrustations to define loops to which jewelry clasps are attachable.

7. A jewelry chain as recited in claim 3, wherein the lands are curved in configuration.

8. A jewelry chain as recited in claim 3, wherein the original links are so twisted that the encrusted links are generally trapezoidal in cross section.

9. A jewelry chain as recited in claim 3, wherein the original links are so twisted that the encrusted links are generally triangular in cross section.

10. A jewelry chain as recited in claim 3, wherein the original links are so twisted that the encrusted links are generally cruciform in cross section.

References Cited

UNITED STATES PATENTS

| | | | |
|---|---|---|---|
| 2,110,226 | 3/1938 | Hill | 59—78 |
| 2,601,575 | 6/1952 | Weinacker | 59—80 |
| 2,711,069 | 6/1955 | Armbrust | 59—80 |

CHARLES W. LANHAM, *Primary Examiner.*

G. P. CROSBY, *Assistant Examiner.*

U.S. Cl. X.R.

59—90; 63—4